(12) United States Patent
Oliveri et al.

(10) Patent No.: US 8,377,286 B2
(45) Date of Patent: Feb. 19, 2013

(54) SOUR SERVICE HYDROPROCESSING FOR DIESEL FUEL PRODUCTION

(75) Inventors: Christopher Gordon Oliveri, Stewartsville, NJ (US); Timothy Lee Hilbert, Fairfax, VA (US); William Jospeh Novak, Bedminster, NJ (US); Stephen John McCarthy, Center Valley, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 462 days.

(21) Appl. No.: 12/653,478

(22) Filed: Dec. 15, 2009

(65) Prior Publication Data

US 2010/0176027 A1 Jul. 15, 2010

Related U.S. Application Data

(60) Provisional application No. 61/204,056, filed on Dec. 31, 2008.

(51) Int. Cl.
| | |
|---|---|
| *C10G 73/02* | (2006.01) |
| *C10G 45/02* | (2006.01) |
| *C10G 45/10* | (2006.01) |
| *C10G 45/12* | (2006.01) |
| *C10G 45/62* | (2006.01) |
| *C10G 45/64* | (2006.01) |

(52) U.S. Cl. ............... 208/89; 208/28; 208/49; 208/57; 208/145

(58) Field of Classification Search .................. 208/28
See application file for complete search history.

(56) References Cited

U.S. PATENT DOCUMENTS

| | | | |
|---|---|---|---|
| 4,917,789 | A | 4/1990 | Butler et al. |
| 5,332,566 | A | 7/1994 | Moini |
| 5,723,716 | A | 3/1998 | Brandes et al. |
| 6,051,129 | A | 4/2000 | Harris et al. |
| 6,413,412 | B1 | 7/2002 | Peng et al. |
| 6,469,226 | B1 | 10/2002 | Chica Lara et al. |
| 6,517,704 | B1 | 2/2003 | Carroll et al. |
| 6,602,402 | B1 | 8/2003 | Benazzi et al. |
| 6,833,064 | B2 | 12/2004 | Berlowitz et al. |
| 6,923,949 | B1 | 8/2005 | Lai et al. |
| 7,148,391 | B1 | 12/2006 | Buchanan et al. |
| 2003/0018228 | A1 | 1/2003 | Vaughn et al. |
| 2003/0102254 | A1 * | 6/2003 | Eijsbouts et al. ......... 208/216 R |
| 2005/0040073 | A1 | 2/2005 | Cody et al. |
| 2005/0092654 | A1 | 5/2005 | Ellis et al. |
| 2006/0091043 | A1 | 5/2006 | Miller |

(Continued)

FOREIGN PATENT DOCUMENTS

WO 2004046278 6/2004

OTHER PUBLICATIONS

Sivasanker et al. "Design of catalyst and process for the dewaxing of petroleum oils", Applied Catalysis A: General, Elsevier Science, Amsterdam, NL, vol. 138, No. 2, May 9, 1996 pp. 369-379, XP022250777 ISSN: 0926-860X the whole document.

(Continued)

*Primary Examiner* — Walter D Griffin
*Assistant Examiner* — Derek Mueller
(74) *Attorney, Agent, or Firm* — Bruce M. Bordelon; David M. Weisberg (57) ABSTRACT

An integrated process for producing diesel fuel from feedstocks, including diesel fuel production under sour conditions, is provided. The ability to process feedstocks under higher sulfur and/or nitrogen conditions allows for reduced cost processing and increases the flexibility in selecting a suitable feedstock. In addition to the benefits in sour service, the process also returns to clean service activity levels more quickly.

19 Claims, 6 Drawing Sheets

U.S. PATENT DOCUMENTS

| | | |
|---|---|---|
| 2006/0173228 A1 | 8/2006 | Chang |
| 2007/0209968 A1 | 9/2007 | Euzen |
| 2009/0176643 A1 | 7/2009 | Elia et al. |
| 2009/0186754 A1 | 7/2009 | Elia et al. |
| 2010/0075831 A1 | 3/2010 | Elia et al. |

OTHER PUBLICATIONS

Marvin F. L. Johnson, "Estimation of the Zeolite Content of a Catalyst from Nitrogen Adsorption Isotherms", Journal of Catalysis, vol. 52, pp. 425-431 (1978).

* cited by examiner

SOUR SERVICE HYDROPROCESSING FOR DIESEL FUEL PRODUCTION

This Application claims the benefit of U.S. Provisional Application 61/204,056 filed Dec. 31, 2008.

FIELD OF THE INVENTION

This invention provides a catalyst and a method of using such a catalyst for processing of high sulfur and/or nitrogen content diesel boiling range fuels.

BACKGROUND OF THE INVENTION

A variety of regional standards exist for the properties of diesel fuels. In particular, the requirements for the cold flow properties of diesel fuel can vary based both on a geographical and a seasonal basis.

One method for improving the cold flow properties of a diesel fuel is to subject the diesel fuel to catalytic dewaxing. The goal of the dewaxing process is to improve the cloud and pour point of the diesel fuel while causing a minimum of loss in yield and/or in cetane. By improving the cloud and/or pour point of the feed, a larger portion of the original feed can be used as diesel fuel, which reduces the amount of feed that is diverted to a lower value process, such as FCC cracking for making gasoline. As a result, process improvements that lead to greater cloud point changes at the same severity are desirable, as such improvements enable the use of a broader slate of feeds for diesel production.

One problem for catalytic dewaxing of diesel fuel is that the dewaxing catalysts are typically sensitive to contaminants such as sulfur or nitrogen. This can pose various problems in developing a stable, integrated diesel production process. Typical diesel fuels are often hydrotreated to remove sulfur to a low level, such as 10 wppm or less. Such diesel fuels are often clean enough to be exposed to a dewaxing catalyst without severely harming the catalyst. However, if a process upset occurs and sulfur contaminants remain in the diesel, the catalyst can be poisoned, and some of the loss of activity may be permanent. Additionally, in diesel fuel production processes involving hydrocracking of heavier feeds, substantial amounts of sulfur and/or nitrogen may remain in the hydrocracked feed. These contaminants can be removed by hydrotreatment, but in order to include a dewaxing step, a conventional dewaxing catalyst may have to be moved to a separate reactor.

SUMMARY OF THE INVENTION

In an embodiment, a method is provided for producing a diesel boiling range fuel. The method includes hydrotreating a diesel boiling range feedstock containing at least 500 vppm of sulfur under effective hydrotreating conditions. At least a portion of the hydrotreated feedstock is then dewaxed in the presence of a dewaxing catalyst under effective catalytic dewaxing conditions. The dewaxing catalyst for dewaxing the hydrotreated feedstock is a molecular sieve having a $SiO_2$:$Al_2O_3$ ratio of 100 or less, and a metal oxide binder, and the dewaxing catalyst has a ratio of zeolite surface area to external surface area of at least 80:100.

DETAILED DESCRIPTION OF THE PREFERRED EMBODIMENTS

Overview

In various embodiments, a process is provided for production of diesel fuel that includes catalytic dewaxing of the feed. The dewaxing includes the use of a catalyst that is more tolerant of contaminants, such as sulfur and nitrogen, as compared to a conventional dewaxing catalyst. Because the dewaxing catalyst is more tolerant of contaminants, the risk of catalyst poisoning due to contaminants is greatly reduced. Additionally, the tolerance of the catalyst for contaminants allows the catalyst to be used at convenient places in a reaction system. For example, conventional dewaxing catalysts must be located at the end of a hydrotreatment train, so that sulfur and nitrogen are removed to suitable levels prior to exposing the dewaxing catalyst to the feed. With a contaminant tolerant dewaxing catalyst, the dewaxing catalyst can be used prior to elimination of all contaminants from the feedstream. This could include using the dewaxing catalyst in the same reactor as hydrotreatment stages, with no separation of gases from the effluent prior to exposure to the dewaxing catalyst. Another option would be to catalytically dewax the diesel feed prior to hydrotreatment.

The contaminant tolerant catalyst retains greater activity when contaminants are present and recovers activity faster when contaminants are removed from the environment. This advantage is achieved by the use of a zeolite with a low silica to alumina ratio and having a high ratio of micropore (zeolite) surface area to external surface area. Alternatively, this advantage is achieved by the use of a zeolite with a low silica to alumina ratio and formulated using a binder having a low surface area. The dewaxing catalyst further includes a metal hydrogenation function, such as a Group VIII metal, preferably a Group VIII noble metal. Preferably, the dewaxing catalyst is a unidimensional 10-member ring catalyst, such as ZSM-48 or ZSM-23.

The external surface area and the micropore, or "zeolite", surface area refer to one way of characterizing the total surface area of a catalyst. These surface areas are calculated based on analysis of nitrogen porosimetry data using the BET method for surface area measurement. (See, for example, Johnson, M. F. L., Jour. Catal., 52, 425 (1978).) The "zeolite" surface area refers to surface area due to micropores within a catalyst. Only the zeolite in a catalyst will contribute to this portion of the surface area. The external surface area can be due to either zeolite or binder within a catalyst.

Feedstocks

The various location-based requirements and specifications for U.S. diesel fuel are provided in ASTM D975. Other similar regulations exist for Europe, Canada, and other countries. These specifications typically include a requirement that sulfur be reduced in the diesel product to 15 wppm or less. Additionally, the cloud point specification is widely variable, but winter month specifications routinely require a cloud point well below 0° C.

Diesel boiling range feedstreams suitable for use in the present invention boil within the range of about 215° F. to about 800° F. Preferably, the diesel boiling range feedstream has an initial boiling point of at least 250° F., or at least 300°

F., or at least 350° F., or at least 400° F., or at least 451° F. Preferably, the diesel boiling range feedstream has a final boiling point of 800° F. or less, or 775° F. or less, or 750° F. or less. In an embodiment, the diesel boiling range feedstream has a boiling range of from 451° F. to about 800° F. In another embodiment, the diesel boiling range feedstream also includes kerosene range compounds to provide a feedstream with a boiling range of from about 250° F. to about 800° F. These feedstreams can have a nitrogen content from about 50 to about 2000 wppm nitrogen, preferably about 50 to about 1500 wppm nitrogen, and more preferably about 75 to about 1000 wppm nitrogen. In an embodiment, feedstreams suitable for use herein have a sulfur content from about 100 to about 40,000 wppm sulfur, preferably about 200 to about 30,000 wppm, and more preferably about 350 to about 25,000 wppm. The feedstreams suitable for use can include feedstreams derived from synthetic sources, such as Fischer-Tropsch hydrocarbons, or feedstreams derived from biocomponent sources, such as animal or vegetable oils, fats, or fatty acids.

Hydrotreatment of Feed

The primary purpose of hydrotreating is typically to reduce the sulfur, nitrogen, and aromatic content of a feed, and is not primarily concerned with boiling point conversion of the feed. Catalysts usually contain at least one Group VIA and/or one Group VIII metal on a support such as alumina or silica. Examples include Ni/Mo, Co/Mo and Ni/W catalysts. Hydrotreating conditions typically include temperatures of 315-425° C., pressures of 300-3000 psig, Liquid Hourly Space Velocities (LHSV) of 0.2-10 $h^{-1}$ and hydrogen treat rates of 500-10000 scf/bbl.

In order to satisfy regulatory requirements, the sulfur present in the diesel product must be below 15 wppm. In order to satisfy this specification, it is desirable to have a lower target sulfur value, so that variations within a process will not result in exceeding the specification. This also provides a margin for error in case subsequent contamination of the diesel fuel occurs, such as during transport.

Note that while hydrotreatment typically occurs prior to dewaxing, in various embodiments the dewaxing process can occur before hydrotreatment, in between hydrotreatment stages, or after hydrotreatment including cascading the entire effluent from a hydrotreatment stage without separation to the dewaxing stage.

Dewaxing Process

In an embodiment, the product from a hydrotreatment stage is directly cascaded into a catalytic dewaxing reaction zone. Unlike a conventional process, no separation is required between the hydrotreatment and catalytic dewaxing stages. Elimination of the separation step has a variety of consequences. With regard to the separation itself, no additional equipment is needed. In some embodiments, the catalytic dewaxing stage and the hydrotreatment stage may be located in the same reactor. Alternatively, the hydrotreatment and catalytic dewaxing processes may take place in separate reactors. Eliminating the separation step also avoids any need to repressurize the feed. Instead, the effluent from the hydrotreatment stage can be maintained at processing pressures as the effluent is delivered to the dewaxing stage.

Eliminating the separation step between hydrotreatment and catalytic dewaxing also means that any sulfur in the feed to the hydrotreatment step will still be in the effluent that is passed from the hydrotreatment step to the catalytic dewaxing step. A portion of the organic sulfur in the feed to the hydrotreatment step will be converted to $H_2S$ during hydrotreatment. Similarly, organic nitrogen in the feed will be converted to ammonia. However, without a separation step, the $H_2S$ and $NH_3$ formed during hydrotreatment will travel with the effluent to the catalytic dewaxing stage. The lack of a separation step also means that any light gases ($C_1$-$C_4$) formed during hydrotreatment will still be present in the effluent.

Elimination of a separation step between hydrotreatment and catalytic dewaxing is enabled in part by the ability of a dewaxing catalyst to maintain catalytic activity in the presence of elevated levels of nitrogen and sulfur. Conventional catalysts often require pre-treatment of a feedstream to reduce the nitrogen content to a few ppm and the sulfur content to less than a few hundred ppm. By contrast, hydrocarbon feedstreams containing up to 0.2 wt. % of nitrogen, based on the feedstream, and up to 3.0 wt. % of sulfur can be effectively processed using the catalysts according to the invention. In an embodiment, the sulfur content of a feedstream can be at least 0.05 wt % sulfur, or at least 0.1 wt %, or at least 0.5 wt %, or at least 1 wt %, or at least 2 wt %, or at least 3 wt %. In another embodiment, the nitrogen content of the feedstream can be at least 25 wppm, or at least 50 wppm, or at least 100 wppm, or at least 250 wppm, or at least 500 wppm. Sulfur and nitrogen contents may be measured by standard ASTM methods D2622 and D4629, respectively.

In an alternative embodiment, catalytic dewaxing can be performed prior to at least one hydrotreatment stage. In such an embodiment, organic sulfur and nitrogen will be present in the feed during dewaxing.

In still another embodiment, catalytic dewaxing can be performed after hydrotreatment and after separation to remove contaminant gases from the hydrotreated feed. In such embodiments, the process according to the invention still provides advantages over conventional methods.

Preferably, the dewaxing catalysts according to the invention are zeolites that perform dewaxing primarily by isomerizing a hydrocarbon feedstock. More preferably, the catalysts are zeolites with a unidimensional pore structure. Suitable catalysts include 10-member ring zeolites, such as EU-1, ZSM-35 (or ferrierite), ZSM-11, ZSM-57, NU-87, SAPO-11, and ZSM-22. Preferred materials are EU-2, EU-11, ZBM-30, ZSM-48, or ZSM-23. ZSM-48 and ZSM-23 are more preferred. Note that a zeolite having the ZSM-23 structure with a silica to alumina ratio of from about 20:1 to about 40:1 can sometimes be referred to as SSZ-32. Other molecular sieves that are isostructural with the above materials include Theta-1, NU-10, EU-13, KZ-1, and NU-23.

In various embodiments, the catalysts according to the invention further include a metal hydrogenation component. The metal hydrogenation component is typically a Group VI and/or a Group VIII metal. Preferably, the metal hydrogenation component is a Group VIII noble metal. More preferably, the metal hydrogenation component is Pt, Pd, or a mixture thereof.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.05 wt % based on catalyst, or at least 0.1 wt %, or at least 0.25 wt %, or at least 0.5 wt %. The amount of metal in the catalyst can be 5 wt % or less based on catalyst, or 2.5 wt % or less, or 1 wt % or less, or 0.75 wt % or less. For embodiments where the metal is Pt, Pd, another Group VIII noble metal, or a combination thereof, the amount of metal is preferably from 0.1 to 2 wt %, and more preferably 0.25 to 1 wt %.

Preferably, the dewaxing catalysts used in processes according to the invention are catalysts with a low ratio of silica to alumina. For example, for ZSM-48, the ratio of silica to alumina in the zeolite can be less than 110:1, less than 100:1, or less than 90:1, or less than 80:1. In preferred embodiments, the ratio of silica to alumina in a ZSM-48 zeolite can be from 60:1 to 110:1, or 70:1 to 100:1. In embodiments involving other zeolites, a silica to alumina ratio corresponding to a low value can vary. For example, in an embodiment where the zeolite is ZSM-23 (or a structural equivalent), the silica to alumina ratio can be 75:1 or less, or 50:1 or less, or 40:1 or less. In an alternative embodiment, another way to determine if a dewaxing catalyst has a low ratio of silica to alumina is by determining the ratio of hydrogenation metal to alumina in the catalyst.

The dewaxing catalysts useful in processes according to the invention can also include a binder. In some embodiments, the dewaxing catalysts used in process according to the invention are formulated using a low surface area binder, a low surface area binder represents a binder with a surface area of 100 $m^2/g$ or less, or 80 $m^2/g$ or less, or 60 $m^2/g$ or less.

Alternatively, a binder can be selected to provide a catalyst with a desired ratio of micropore surface area to external surface area. In dewaxing catalysts used according to the invention, the micropore surface area corresponds to surface area from the pores of zeolites in the dewaxing catalyst. Any binder used in the catalyst will not contribute to the micropore surface area. Thus, the micropore surface area could also be referred to as the zeolite surface area. The external surface area represents the balance of the surface area of the total catalyst. Both the binder and zeolite can contribute to this value.

Preferably, the micropore (or zeolite) surface area for a dewaxing catalyst will be roughly equal to or greater than the external surface area. In an embodiment, the ratio of micropore surface area to external surface area is at least 80:100, or at least 90:100, or at least 95:100. Preferably, the ratio of micropore surface area to external surface area is at least 100:100 (or 1:1), or at least 105:100, or at least 110:100, or at least 115:100.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of binder in the catalyst can be from 5 to 95 wt % based on catalyst, preferably 10 to 90 wt %, more preferably 20 to 80 wt %, still more preferably 30 to 70 wt %. In another preferred embodiment, the amount of zeolite is at least 50 wt % based on catalyst.

In yet another embodiment, a binder composed of two or more metal oxides can also be used. In such an embodiment, the weight percentage of the low surface area binder is preferably greater than the weight percentage of the higher surface area binder. For example, in a catalyst that is composed of 65 wt % zeolite and 35 wt % of a binder composed of two or more metal oxides, it is preferable to have at least 20 wt % of the lower surface area binder. Alternatively, if both metal oxides used for forming a mixed metal oxide binder have a sufficiently low surface area, the proportions of each metal oxide in the binder are less important. When two or more metal oxides are used to form a binder, the two metal oxides can be incorporated into the catalyst by any convenient method. For example, one binder can be mixed with the zeolite during formation of the zeolite powder, such as during spray drying. The spray dried zeolite/binder powder can then be mixed with the second metal oxide binder prior to extrusion.

Process conditions in the catalytic dewaxing zone include temperatures of 280-380° C., pressures of 300-3000 psig, LHSV of 0.1-5.0 $h^{-1}$ and treat gas rates of from 500-5000 scf/bbl.

The process is further described with reference to a representative process shown in FIG. 6. Fresh feed is fed through line 15 to hydrotreater 20 to produce a hydrotreated product, hydrogen sulfide, ammonia and light hydrocarbon gases. The hydrogen for the first hydroprocessing zone can be provided, for example, from recycle apparatus 70 via line 35. Alternatively, the first hydroprocessing zone could be supplied with a fresh hydrogen stream. The products from the hydrotreater are passed through to an optional separation zone 30. If optional separation zone 30 is present, the liquid hydrotreated product is stripped with make-up hydrogen gas that is passed to optional separation zone 30 via line 25. Light hydrocarbons, hydrogen sulfide and ammonia are separated from the hydrotreated product and can be sent, for example, to a second separation zone 40 for eventual separation of contaminants from hydrogen so that the hydrogen can be recycled. The stripped hydrotreated product is sent to the second catalytic dewaxer 50. Alternatively, if optional separation zone 30 is not present, the entire effluent from hydrotreater 20 is passed to catalytic dewaxer 50. Note that in this latter embodiment, the hydrotreatment and catalytic dewaxing stages can be located in the same reactor.

The catalytic dewaxer removes and/or modifies waxy paraffins from the hydrotreated product by selective hydrocracking, isomerization or some combination thereof. The hydrogen for the catalytic dewaxing process can be provided directly into the catalytic dewaxer 50, or as shown in FIG. 6, the hydrogen for catalytic dewaxer 50 can be provided by the make-up hydrogen flow used in first separation zone 30 and additional hydrogen from the recycle apparatus. Still other methods for providing the needed hydrogen in the reaction system will be apparent to those of skill in the art. The resulting dewaxed product and any gases are then passed to separation zone 60. The separator that comprises separation zone 60 separates liquid product from gases. The liquid product (the dewaxed product) is passed through line 65 for use as a diesel fuel product. The gaseous product from separator 60 is passed to the same recycle loop used for the gas phase product from separator 40.

Figure 6:
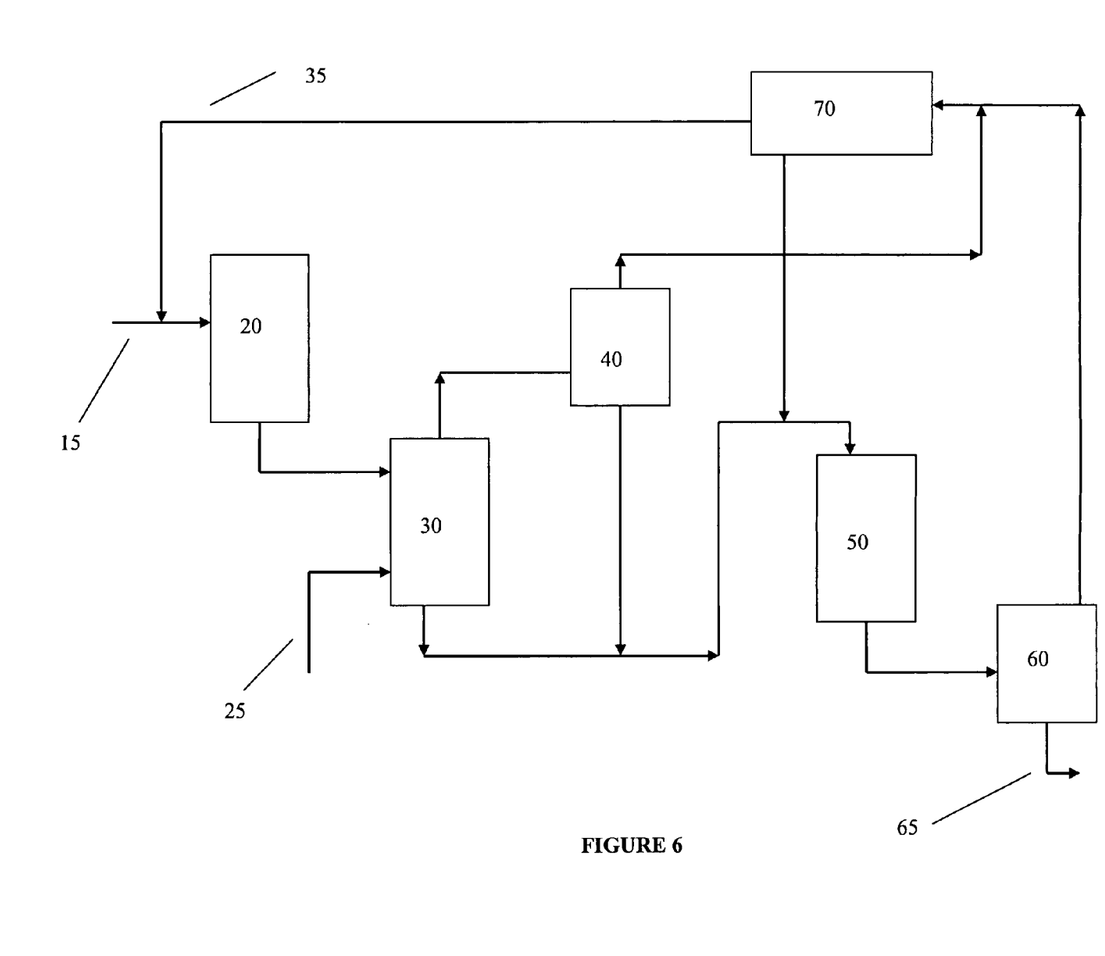
FIG. 6 schematically shows a system for producing a diesel fuel.

In still another embodiment, the location of the hydrotreater and catalytic dewaxer in FIG. 6 can be reversed. For example, instead of having a hydrotreater 20, the reactor in that location can be used for catalytic dewaxing, while the later reactor is used for hydrotreatment. In yet another embodiment, a catalytic dewaxing stage can be located prior to at least one hydrotreatment stage.

PROCESSING EXAMPLES

The following examples represent pilot plant runs carried out in the presence of a dewaxing catalyst according to the invention and a comparative catalyst. The initial feed used for the following examples was a diesel range boiling feed having less than 10 wppm sulfur and less than 5 wppm nitrogen. In some of the examples, additional contaminants were added to the feed to determine the impact of nitrogen and sulfur on the activity of the catalysts. Note that modifying the space velocity in the dewaxing reactor between about 3 to about 6 did not qualitatively change the results, although a higher temperature was needed at 6 LHSV to achieve the same change in cloud point as at 3 LHSV. For example, in Processing Example 1 below, the temperature was increased to 630° F. at 6 LHSV in order to achieve the same cloud point change observed at 610° F. for 3 LHSV.

In the examples, the catalyst according to the invention was 0.6 wt % Pt on titania bound ZSM-48. The silica to alumina ratio for the ZSM-48 was 70:1, and the ratio of zeolite to titania was 65:35. The comparative catalyst was 0.6 wt % Pt on alumina bound ZSM-48 (180:1 silica to alumina ratio). The ratio of zeolite to alumina was also 65:35.

Processing Example 1

Clean Service

For the comparative catalyst, a cloud point change (reduction) of 55° C. was obtained at an estimated internal temperature of 610° F. For the catalyst according to the invention, a cloud point change of 50° C. was obtained at 590° F. Thus, the catalyst according to the invention was able to provide a similar cloud point change at a temperature about 20° F. lower than the comparative catalyst.

Processing Example 2

NH₃ Contamination

The comparative catalyst produced a total liquid product with a cloud point change of 43° C. and 12° C. for 50 and 250 ppmv NH₃, respectively, at an estimated internal temperature of 610° F. The catalyst according to the invention produced a total liquid product having a cloud point change of 18° C. at 590° F. with 50 ppmv of NH₃, and a cloud point change of 9° C. at 600° F. for 250 ppmv NH₃. Based on these results, the performance of the comparative catalyst and the catalyst according to the invention appears comparable in the presence of NH₃ as a contaminant. However, the catalyst according to the invention had a faster recovery time after exposure to NH₃. When the contaminants were removed, the catalyst according to the invention returned to its clean service activity almost immediately, while the comparative catalyst took 6 days at 610° F. to return to the activity shown during clean service.

Processing Example 3

H₂S Contamination

The comparative catalyst experienced a significant debit in activity upon addition of H₂S. In the case of 5000 ppmv H₂S, a cloud point change of only 5° C. was obtained at 630° F. The catalyst required an additional 50° F. increase in temperature to obtain a cloud point change of 34° C. For the catalyst according to the invention, a cloud point change of 19° C. was obtained at 620° F., highlighting the significantly increased tolerance towards H₂S.

Processing Example 4

Organic Nitrogen Contamination 50 ppm organic nitrogen (aniline) was added to the feed and the feed was processed at an estimated internal temperature of 630° F., resulting in a cloud point change of 17° C. for the comparative catalyst. For the catalyst according to the invention, a cloud point change of 32° C. was obtained at a temperature of 630° F. The catalyst according to the invention showed a modest activity benefit over the comparative catalyst. However, the recovery time for the catalyst according to the invention was much shorter. Upon exposure to a clean feed, the catalyst according to the invention returned to clean service activity levels in about 1 day, while the comparative catalyst did not return to clean service activity levels until after 10 days of processing clean feed at 630° F.

Processing Example 5

Nitrogen Plus Sulfur

A feed spiked with 56 ppm organic nitrogen spiked feed and processed using 5000 ppmv H₂S/H₂ yielded a product having a cloud point change of 34 at an estimated internal temperature 670° F. with the catalyst according to the invention. Since the comparative catalyst was only capable of yielding a total liquid product with a cloud point change of 34° C. when operating with only 5000 ppmv H₂S at 680° F. (and not the nitrogen), this data further demonstrates the tolerance of the catalyst according to the invention towards contaminants.

Dewaxing Catalyst Synthesis

One example of a molecular sieve suitable for use in the claimed invention is ZSM-48 with a SiO₂:Al₂O₃ ratio of less than 110, preferably from about 70 to about 110. In the embodiments below, ZSM-48 crystals will be described variously in terms of "as-synthesized" crystals that still contain the organic template; calcined crystals, such as Na-form ZSM-48 crystals; or calcined and ion-exchanged crystals, such as H-form ZSM-48 crystals.

The ZSM-48 crystals after removal of the structural directing agent have a particular morphology and a molar composition according to the general formula:

$(n)\text{SiO}_2:\text{Al}_2\text{O}_3$ where n is from 70 to 110, preferably 80 to 100, more preferably 85 to 95. In another embodiment, n is at least 70, or at least 80, or at least 85. In yet another embodiment, n is 110 or less, or 100 or less, or 95 or less. In still other embodiments, Si may be replaced by Ge and Al may be replaced by Ga, B, Fe, Ti, V, and Zr.

The as-synthesized form of ZSM-48 crystals is prepared from a mixture having silica, alumina, base and hexamethonium salt directing agent. In an embodiment, the molar ratio of structural directing agent:silica in the mixture is less than 0.05, or less than 0.025, or less than 0.022. In another embodiment, the molar ratio of structural directing agent:silica in the mixture is at least 0.01, or at least 0.015, or at least 0.016. In still another embodiment, the molar ratio of structural directing agent:silica in the mixture is from 0.015 to 0.025, preferably 0.016 to 0.022. In an embodiment, the as-synthesized form of ZSM-48 crystals has a silica:alumina molar ratio of 70 to 110. In still another embodiment, the as-synthesized form of ZSM-48 crystals has a silica:alumina molar ratio of at least 70, or at least 80, or at least 85. In yet another embodiment, the as-synthesized form of ZSM-48 crystals has a silica:alumina molar ratio of 110 or less, or 100 or less, or 95 or less. For any given preparation of the as-synthesized form of ZSM-48 crystals, the molar composition will contain silica, alumina and directing agent. It should be noted that the as-synthesized form of ZSM-48 crystals may have molar ratios slightly different from the molar ratios of reactants of the reaction mixture used to prepare the as-synthesized form.

This result may occur due to incomplete incorporation of 100% of the reactants of the reaction mixture into the crystals formed (from the reaction mixture).

The ZSM-48 composition is prepared from an aqueous reaction mixture comprising silica or silicate salt, alumina or soluble aluminate salt, base and directing agent. To achieve the desired crystal morphology, the reactants in reaction mixture have the following molar ratios:

$SiO_2:Al_2O_3$=70 to 110
$H_2O:SiO_2$=1 to 500
$OH^-:SiO_2$=0.1 to 0.3
$OH^-:SiO_2$ (preferred)=0.14 to 0.18
template:$SiO_2$=0.01-0.05
template:$SiO_2$ (preferred)=0.015 to 0.025

In the above ratios, two ranges are provided for both the base:silica ratio and the structure directing agent:silica ratio. The broader ranges for these ratios include mixtures that result in the formation of ZSM-48 crystals with some quantity of Kenyaite and/or needle-like morphology. For situations where Kenyaite and/or needle-like morphology is not desired, the preferred ranges should be used, as is further illustrated below in the Examples.

The silica source is preferably precipitated silica and is commercially available from Degussa. Other silica sources include powdered silica including precipitated silica such as Zeosil® and silica gels, silicic acid colloidal silica such as Ludox® or dissolved silica. In the presence of a base, these other silica sources may form silicates. The alumina may be in the form of a soluble salt, preferably the sodium salt and is commercially available from US Aluminate. Other suitable aluminum sources include other aluminum salts such as the chloride, aluminum alcoholates or hydrated alumina such as gamma alumina, pseudobohemite and colloidal alumina. The base used to dissolve the metal oxide can be any alkali metal hydroxide, preferably sodium or potassium hydroxide, ammonium hydroxide, diquaternary hydroxide and the like. The directing agent is a hexamethonium salt such as hexamethonium dichloride or hexamethonium hydroxide. The anion (other than chloride) could be other anions such as hydroxide, nitrate, sulfate, other halide and the like. Hexamethonium dichloride is N,N,N,N',N',N'-hexamethyl-1,6-hexanediammonium dichloride.

In an embodiment, the crystals obtained from the synthesis according to the invention have a morphology that is free of fibrous morphology. Fibrous morphology is not desired, as this crystal morphology inhibits the catalytic dewaxing activity of ZSM-48. In another embodiment, the crystals obtained from the synthesis according to the invention have a morphology that contains a low percentage of needle-like morphology. The amount of needle-like morphology present in the ZSM-48 crystals can be 10% or less, or 5% or less, or 1% or less. In an alternative embodiment, the ZSM-48 crystals can be free of needle-like morphology. Low amounts of needle-like crystals are preferred for some applications as needle-like crystals are believed to reduce the activity of ZSM-48 for some types of reactions. To obtain a desired morphology in high purity, the ratios of silica:alumina, base:silica and directing agent:silica in the reaction mixture according to embodiments of the invention should be employed. Additionally, if a composition free of Kenyaite and/or free of needle-like morphology is desired, the preferred ranges should be used.

The as-synthesized ZSM-48 crystals should be at least partially dried prior to use or further treatment. Drying may be accomplished by heating at temperatures of from 100 to 400° C., preferably from 100 to 250° C. Pressures may be atmospheric or subatmospheric. If drying is performed under partial vacuum conditions, the temperatures may be lower than those at atmospheric pressures Catalysts are typically bound with a binder or matrix material prior to use. Binders are resistant to temperatures of the use desired and are attrition resistant. Binders may be catalytically active or inactive and include other zeolites, other inorganic materials such as clays and metal oxides such as alumina, silica, titania, zirconia, and silica-alumina. Clays may be kaolin, bentonite and montmorillonite and are commercially available. They may be blended with other materials such as silicates. Other porous matrix materials in addition to silica-aluminas include other binary materials such as silica-magnesia, silica-thoria, silica-zirconia, silica-beryllia and silica-titania as well as ternary materials such as silica-alumina-magnesia, silica-alumina-thoria and silica-alumina-zirconia. The matrix can be in the form of a co-gel. The bound ZSM-48 may range from 10 to 100 wt. % ZSM-48, based on bound ZSM-48 with the balance being binder.

ZSM-48 crystals as part of a catalyst may also be used with a metal hydrogenation component. Metal hydrogenation components may be from Groups 6-12 of the Periodic Table based on the IUPAC system having Groups 1-18, preferably Groups 6 and 8-10. Examples of such metals include Ni, Mo, Co, W, Mn, Cu, Zn, Ru, Pt or Pd, preferably Pt or Pd. Mixtures of hydrogenation metals may also be used such as Co/Mo, Ni/Mo, Ni/W and Pt/Pd, preferably Pt/Pd. The amount of hydrogenation metal or metals may range from 0.1 to 5 wt. %, based on catalyst. In an embodiment, the amount of metal or metals is at least 0.1 wt %, or at least 0.25 wt %, or at least 0.5 wt %, or at least 0.6 wt %, or at least 0.75 wt %. In another embodiment, the amount of metal or metals is 5 wt % or less, or 4 wt % or less, or 3 wt % or less, or 2 wt % or less, or 1 wt % or less. Methods of loading metal onto ZSM-48 catalyst are well known and include, for example, impregnation of ZSM-48 catalyst with a metal salt of the hydrogenation component and heating. The ZSM-48 catalyst containing hydrogenation metal may also be sulfided prior to use. The catalyst may also be steamed prior to use.

High purity ZSM-48 crystals made according to the above embodiments have a relatively low silica:alumina ratio. This lower silica:alumina ratio means that the present catalysts are more acidic. In spite of this increased acidity, they have superior activity and selectivity as well as excellent yields. They also have environmental benefits from the standpoint of health effects from crystal form and the small crystal size is also beneficial to catalyst activity.

For catalysts according to the invention that incorporate ZSM-23, any suitable method for producing ZSM-23 with a low $SiO_2:Al_2O_3$ ratio may be used. U.S. Pat. No. 5,332,566 provides an example of a synthesis method suitable for producing ZSM-23 with a low ratio of $SiO_2:Al_2O_3$. For example, a directing agent suitable for preparing ZSM-23 can be formed by methylating iminobispropylamine with an excess of iodomethane. The methylation is achieved by adding the iodomethane dropwise to iminobispropylamine which is solvated in absolute ethanol. The mixture is heated to a reflux temperature of 77° C. for 18 hours. The resulting solid product is filtered and washed with absolute ethanol.

The directing agent produced by the above method can then be mixed with colloidal silica sol (30% $SiO_2$), a source of alumina, a source of alkali cations (such as Na or K), and deionized water to form a hydrogel. The alumina source can be any convenient source, such as alumina sulfate or sodium aluminate. The solution is then heated to a crystallization temperature, such as 170° C., and the resulting ZSM-23 crystals are dried. The ZSM-23 crystals can then be combined with a low surface area binder to form a catalyst according to the invention.

Catalyst Example 1

0.6 wt % Pt(IW) on 65/35 ZSM-48(90/1)/TiO$_2$

65% ZSM-48(90/1) and 35% Titania were extruded to a 1/16" quadrulobe. The extrudate was pre-calcined in N$_2$@1000° F., ammonium exchanged with 1N ammonium nitrate, and then dried at 250° F., followed by calcination in air at 1000° F. The extrudate was then was loaded with 0.6 wt % Pt by incipient wetness impregnation with platinum tetraammine nitrate, dried at 250° F., and calcined in air at 680° F. for 3 hours. Table 1 provides the surface area of the extrudate via N$_2$ porosimetry.

A batch micro-autoclave system was used to determine the activity of the above catalyst. The catalyst was reduced under hydrogen followed by the addition of 2.5 grams of a 130N feed (cloud point 31). The reaction was run at 400 psig at 330° C. for 12 hours. Cloud points were determined for two feed space velocities. Results are provided in Table 2.

Catalyst Example 2

0.6 wt % Pt(IW) on 65/35 ZSM-48(90/1)/Al$_2$O$_3$ (Comparative)

65% ZSM-48(90/1) and 35% Al$_2$O$_3$ were extruded to a 1/16" quadrulobe. The extrudate was pre-calcined in N$_2$@1000° F., ammonium exchanged with 1N ammonium nitrate, and then dried at 250° F. followed by calcination in air at 1000° F. The extrudate was then steamed (3 hours at 890° F.). The extrudate was then loaded with 0.6 wt % Pt by incipient wetness impregnation with platinum tetraammine nitrate, dried at 250° F., and calcined in air at 680° F. for 3 hours. Table 1 provides the surface area of the extrudate via N$_2$ porosimetry.

A batch micro-autoclave system was used to determine the activity of the above catalyst. The catalyst was reduced under hydrogen followed by the addition of 2.5 grams of a 130N feed. The reaction was run at 400 psig at 330° C. for 12 hours. Cloud points were determined for two feed space velocities. Results are provided in Table 2.

Catalyst Example 3

0.6 wt % Pt(IW) on 80/20 ZSM-48(90/1)/SiO$_2$

80% ZSM-48(90/1) and 20% SiO$_2$ were extruded to 1/16" quadrulobe. The extrudate was pre-calcined in N$_2$@1000° F., ammonium exchanged with 1N ammonium nitrate, and then dried at 250° F. followed by calcination in air at 1000° F. The extrudate was then loaded with 0.6 wt % Pt by incipient wetness impregnation with platinum tetraammine nitrate, dried at 250° F., and calcined in air at 680° F. for 3 hours. Table 1 provides the surface area of the extrudate via N$_2$ porosimetry.

A batch micro-autoclave system was used to determine the activity of the above catalyst. The catalyst was reduced under hydrogen followed by the addition of 2.5 grams 130 N. The reaction was run at 400 psig at 330° C. for 12 hours. Cloud points were determined for two feed space velocities. Results are provided in Table 2.

Catalyst Example 4

0.6 wt % Pt(IW) on 65/35 ZSM-48(90/1)/Theta-Alumina

Pseudobohemite alumina was calcined at 1000° C. to convert it to a lower surface area theta phase, as compared to the gamma phase alumina used as the binder in Example 2 above. 65% of ZSM-48(90/1) and 35% of the calcined alumina were extruded with 0.25% PVA to 1/16" quadrulobes. The extrudate was pre-calcined in N$_2$ at 950° F., ammonium exchanged with 1N ammonium nitrate, and then dried at 250° F. followed by calcination in air at 1000° F. The extrudate was then loaded with 0.6 wt % Pt by incipient wetness impregnation with platinum tetraammine nitrate, dried at 250° F., and calcined in air at 680° F. for 3 hours. Table I provides the surface area of the extrudate via N$_2$ porosimetry.

A batch micro-autoclave system was used to determine the activity of the above catalyst. The catalyst was reduced under hydrogen followed by the addition of 2.5 grams 130N. The reaction was run at 400 psig at 330° C. for 12 hours. Cloud points were determined for two feed space velocities. Results are provided in Table 2.

Catalyst Example 5

0.6 wt % Pt(IW) on 65/35 ZSM-48(90/1)/Zirconia

65% ZSM-48(90/1) and 35% Zirconia were extruded to a 1/16" quadrulobe. The extrudate was pre-calcined in N$_2$@1000° F., ammonium exchanged with 1N ammonium nitrate, and then dried at 250° F. followed by calcination in air at 1000° F. The extrudate was then was loaded with 0.6 wt % Pt by incipient wetness impregnation with platinum tetraammine nitrate, dried at 250° F., and calcined in air at 680° F. for 3 hours. Table I provides the surface area of the extrudate via N$_2$ porosimetry.

A batch micro-autoclave system was used to determine the activity of the above catalyst. The catalyst was reduced under hydrogen followed by the addition of 2.5 grams 130N. The reaction was run at 400 psig at 330° C. for 12 hours. Cloud points were determined for two feed space velocities. Results are provided in Table 2.

TABLE 1

| Example | | BET SA (m$^2$/g) | Zeolite SA (m$^2$/g) | External SA (m$^2$/g) |
|---|---|---|---|---|
| 1 | 0.6% Pt on 65/35 ZSM-48 (90/1)/Titania | 200 | 95 | 104 |
| 2 | 0.6% Pt on 65/35 ZSM-48 (90/1)/Al$_2$O$_3$ | 232 | 50 | 182 |
| 3 | 0.6% Pt on 80/20 ZSM-48 (90/1)/Silica | 211 | 114 | 97 |
| 4 | 0.6% Pt on 65/35 ZSM-48 (90/1)/Theta-alumina | 238 | 117 | 121 |
| 5 | 0.6% Pt on 65/35 ZSM-48 (90/1)/Zirconia | 225 | 128 | 97 |

Table 1 shows that the catalysts from Examples 1, 3, 4, and 5 all have an zeolite surface area that is at least roughly comparable to the external surface area.

TABLE 2

| | WHSV | Cloud Point (° C.) |
|---|---|---|
| 1 | 0.71 | −45* |
| 1 | 1.03 | −35 |

TABLE 2-continued

| | WHSV | Cloud Point (° C.) |
|---|---|---|
| 2 | 0.75 | −26 |
| 2 | N/A | N/A |
| 3 | 0.71 | −45* |
| 3 | 1.01 | −28 |
| 4 | 0.73 | −45* |
| 4 | 1.03 | −12 |
| 5 | 0.73 | −45* |
| 5 | 0.99 | −45* |

Note that in Table 2, a value of −45° C. represents the low end of the measurement range for the instrument used to measure the cloud point. Cloud point measurements indicated with an asterisk are believed to represent the detection limit of the instrument, rather than the actual cloud point value of the processed feed. As shown in Table 2, all of the catalysts with an zeolite surface area that is at least roughly comparable to the external surface area produced a product with the lowest detectable cloud point at a space velocity near 0.75. By contrast, the catalyst from Example 2, with the higher external surface area, produced a cloud point of only −26 for a space velocity near 0.75. Note that the alumina used to form the catalyst in Example 2 also corresponds to high surface area binder. At the higher space velocity of about 1.0, all of the low surface area binder catalysts also produced good results.

Catalyst Example 6

Hydrodewaxing Catalysts with High Silica to Alumina Ratios (Comparative)

Additional catalyst evaluations were carried out on comparative catalysts having a zeolite with a high silica to alumina ratio. A catalyst of 0.6 wt % Pt on 65/35 ZSM-48(180/1)/$TiO_2$ was prepared according to the following procedure. A corresponding sample was also prepared using $Al_2O_3$ instead of $TiO_2$, which produced a catalyst of 0.6 wt % Pt on 65/35 ZSM-48 (180/1)/$Al_2O_3$.

An extrudate consisting of 65% (180/1 Si/$Al_2$) ZSM-48 and 35% Titania (50 grams) was loaded with 0.6 wt % Pt by incipient wetness impregnation with platinum tetraammine nitrate, dried at 250° F. and calcined in full air at 680° F. for 3 hours. As shown above in Table 1, the $TiO_2$ binder provides a formulated catalyst with a high ratio of zeolite surface area to external surface area. The $TiO_2$ binder also provides a lower acidity than an $Al_2O_3$ binder.

The above two catalysts were used for hydrodewaxing experiments on a multi-component model compound system designed to model a 130N raffinate. The multi-component model feed was made of 40% n-hexadecane in a decalin solvent with 0.5% dibenzothiophene (DBT) and 100 ppm N in quinoline added (bulky S, N species to monitor HDS/HDN). The feed system was designed to simulate a real waxy feed composition.

Hydrodewaxing studies were performed using a continuous catalyst testing unit composed of a liquid feed system with an ISCO syringe pump, a fixed-bed tubular reactor with a three-zone furnace, liquid product collection, and an on-line MTI GC for gas analysis. Typically, 10 cc of catalyst was sized and charged in a down-flow ⅜"stainless steel reactor containing a ⅛" thermowell. After the unit was pressure tested, the catalyst was dried at 300° C. for 2 hours with 250 cc/min $N_2$ at ambient pressure. The catalysts were then reduced by hydrogen reduction. Upon completion of the catalyst treatment, the reactor was cooled to 150° C., the unit pressure was set to 600 psig by adjusting a back-pressure regulator and the gas flow was switched from $N_2$ to $H_2$. Liquid feedstock was introduced into the reactor at 1 liquid hourly space velocity (LHSV). Once the liquid feed reached the downstream knockout pot, the reactor temperature was increased to the target value. A material balance was initiated until the unit was lined out for 6 hours. The total liquid product was collected in the material balance dropout pot and analyzed by an HP 5880 gas chromatograph (GC) with FID. The detailed aromatic component conversion and products were identified and calculated by GC analysis. Gas samples were analyzed with an on-line HP MTI GC equipped with both TCD and FID detectors. A series of runs were performed to understand catalyst activity/product properties as function of process temperature.

All catalysts were loaded in an amount of 10 cc in the reactor and were evaluated using the operating procedure described in Example 8 at the following conditions: T=270-380° C., P=600 psig, liquid rate=10 cc/hr, $H_2$ circulation rate=2500 scf/bbl, and LHSV=1 $hr^{-1}$.

Figure 1:
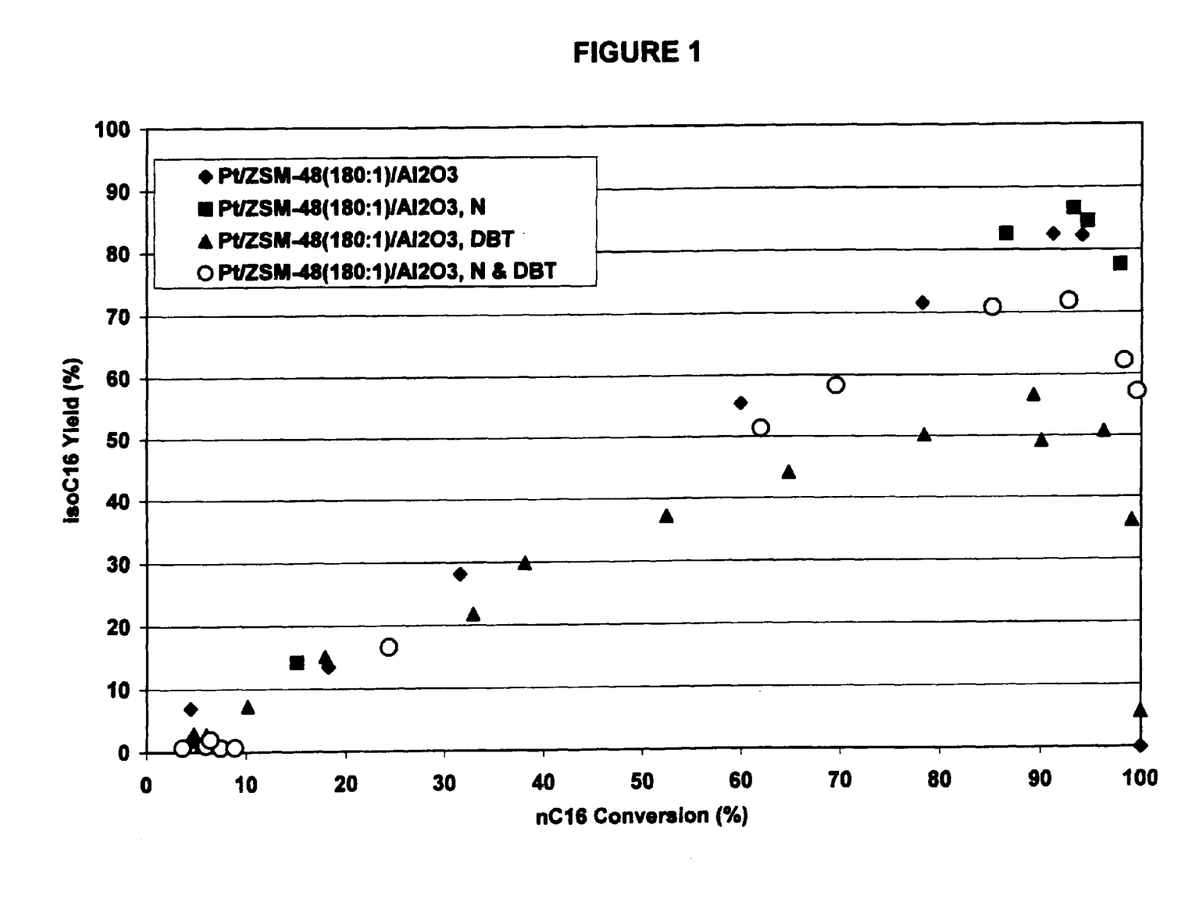
FIGS. 1 and 2 show the activity of comparative catalysts.
Figure 2:
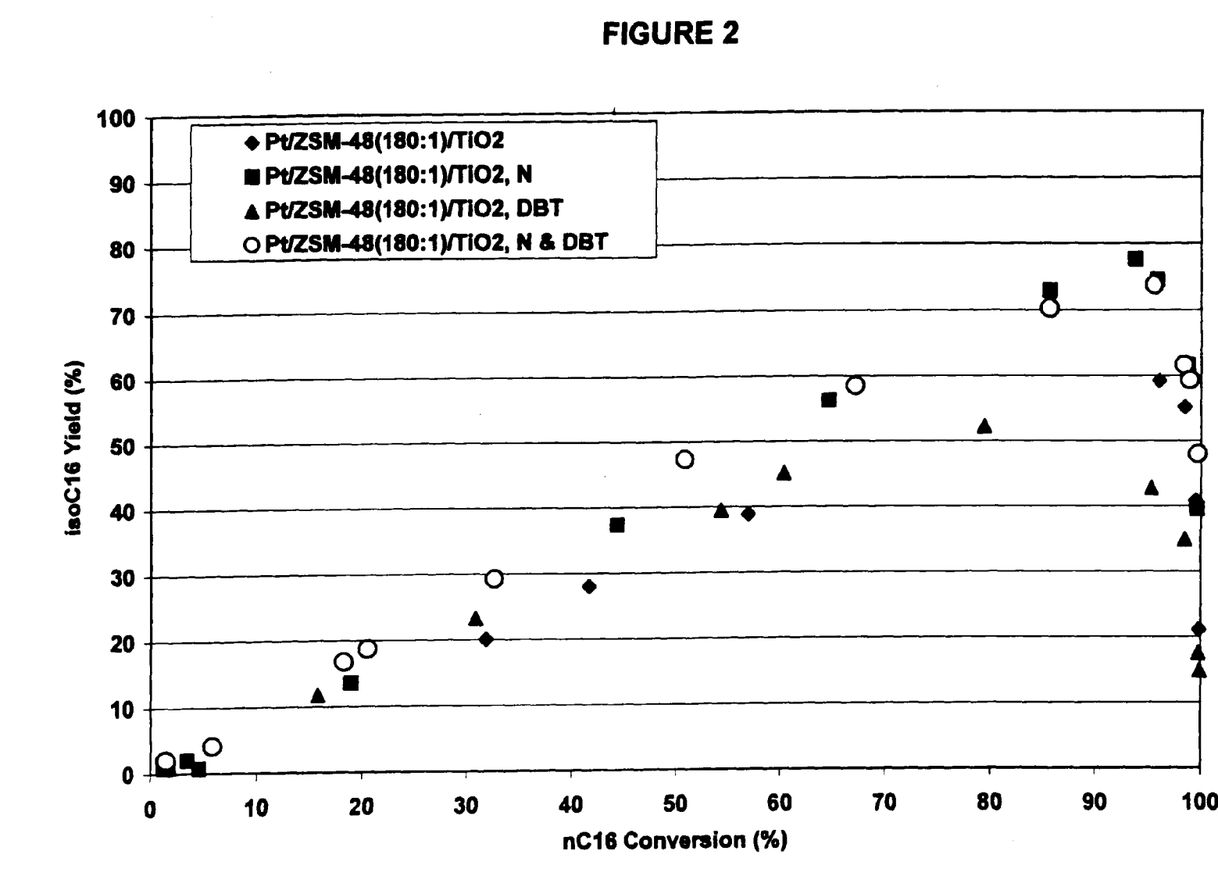

The n-hexadecane ($nC_{16}$) isomerization activity and yield are summarized in FIGS. 1 and 2. FIG. 1 shows the relationship between $nC_{16}$ conversion and iso-$C_{16}$ yield for a clean feed and spiked feeds for the alumina bound (higher surface area) catalyst. FIG. 2 shows similar relationships for the titania bound (lower surface area) catalyst. In general, the catalysts with higher and lower surface area binders show similar conversion efficiency. The low surface area catalyst (FIG. 2) has slightly lower conversion efficiencies relative to yield as compared to the higher surface area catalyst. For each of these feeds, the temperatures needed to achieve a given $nC_{16}$ conversion level were similar for the two types of catalyst.

FIGS. 1 and 2 demonstrate that the advantages of the claimed invention cannot be achieved simply by using a low surface area binder with any dewaxing catalyst. When exposed to a clean feed or a feed containing one or more of sulfur and nitrogen, the dewaxing catalyst with a high silica to alumina ratio showed similar, or possibly even reduced activity when formulated with a low surface area binder relative to a higher surface area binder.

Catalyst Example 7

Hydrodewaxing Over 0.6 wt % Pt on 65/35 ZSM-48(90/1)/$TiO_2$ Using 130N Feed

This example illustrates the catalytic performance of 0.6 wt % Pt on 65/35 ZSM-48(90/1)/$TiO_2$ versus a corresponding alumina-bound (higher external surface area) catalyst using 130N raffinate.

An extrudate consisting of 65% (90/1 Si/$Al_2$) ZSM-48 and 35% Titania (30 grams) was loaded with 0.6 wt % Pt by incipient wetness impregnation with platinum tetraammine nitrate, dried at 250° F. and calcined in full air at 680° F. for 3 hours. A corresponding sample was also prepared using $Al_2O_3$ instead of $TiO_2$.

The catalysts were loaded in a 10 cc amount in the reactor and were evaluated using the operating procedure described in Example 6 at the following conditions: T=330-380° C., P=400 psig, liquid rate=5 cc/hr, $H_2$ circulation rate=5000 scf/bbl, and LHSV=0.5 $hr^{-1}$. The catalysts were exposed to the 130N raffinate which contained 66 wppm N and 0.63 wt % S.

Figure 3:
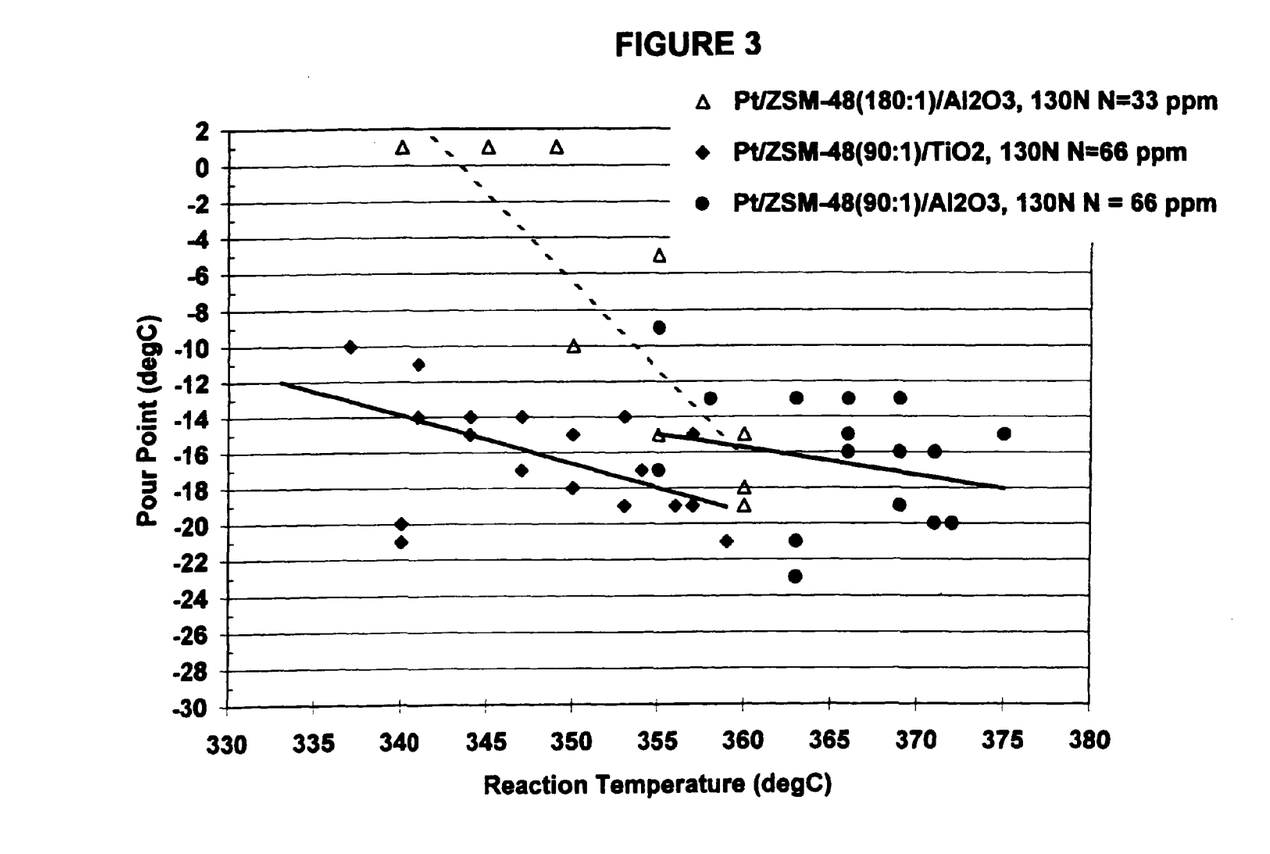
FIG. 3 shows the correlation between hydroprocessing temperature and pour point for various catalysts.

FIG. 3 shows the relative catalyst activity of the 0.6 wt % Pt on 65/35 ZSM-48(90/1)/TiO$_2$ catalyst and the corresponding alumina bound catalyst. For the 130N raffinate feed, compared with the corresponding alumina bound catalyst, the 0.6 wt % Pt on 65/35 ZSM-48(90/1)/TiO$_2$ catalyst showed a 20° C. temperature advantage (i.e. more active at 20° C. lower temp) at the given product pour point. Note that FIG. 3 also shows data for a 130N raffinate feed with half the nitrogen content that was hydroprocessed using 65/35 ZSM-48 (180/1)/Al$_2$O$_3$ with 0.6 wt % Pt. (This is the alumina bound catalyst from Example 6.) Even at twice the nitrogen content, the lower surface area 65/35 ZSM-48(90/1)/TiO$_2$ with 0.6 wt % Pt catalyst achieved a substantial activity credit.

Figure 4:
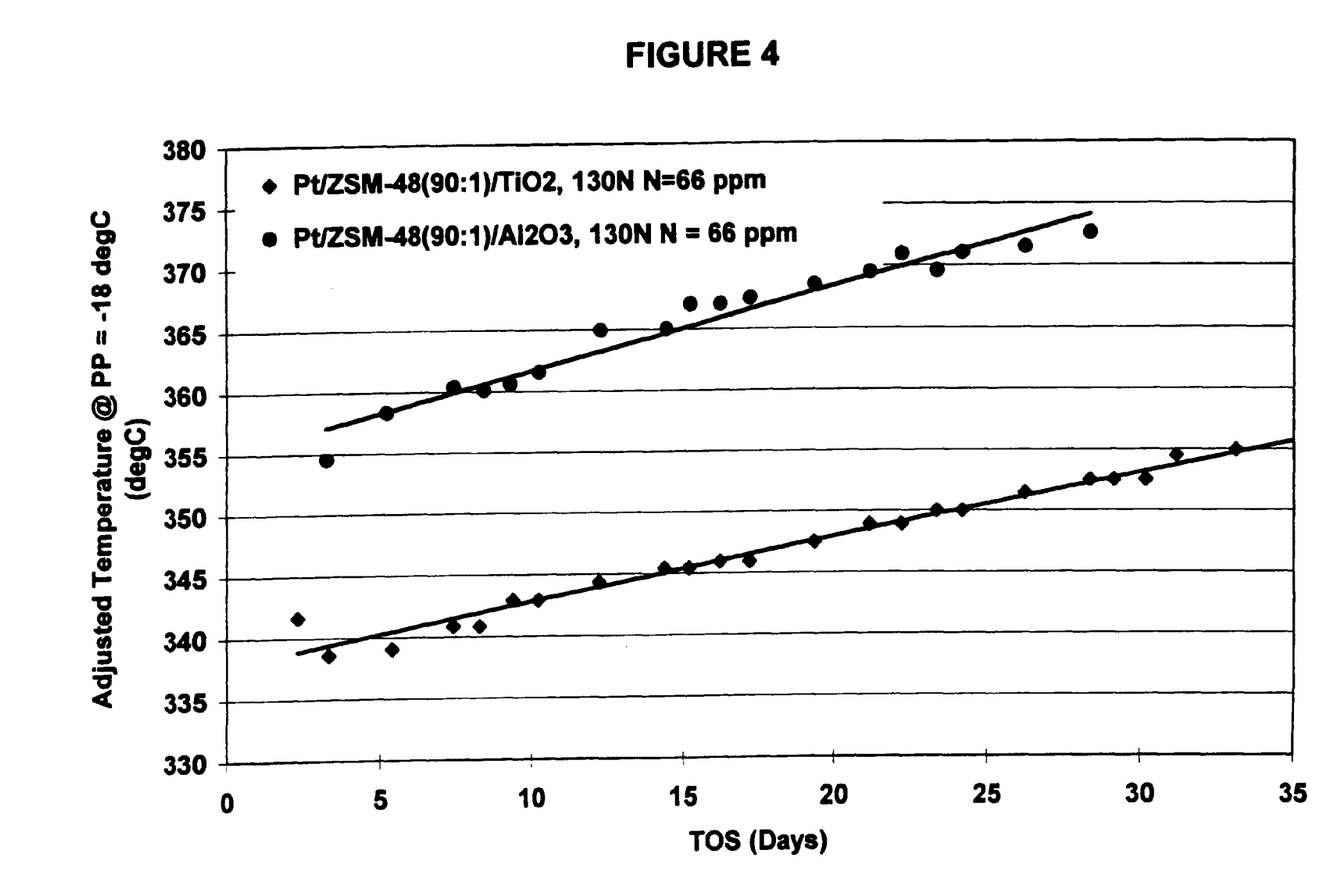
FIG. 4 shows an aging rate for various catalysts.

To further demonstrate the benefit of the low surface area, low silica to alumina ratio catalyst, FIG. 4 shows a TIR plot for the 0.6 wt % Pt on 65/35 ZSM-48(90/1)/TiO$_2$ catalyst and the corresponding alumina-bound catalyst. The TIR plot shows that the aging rate for the 0.6 wt % Pt on 65/35 ZSM-48(90/1)/TiO$_2$ catalyst was 0.624° C./day compared to 0.69° C./day for the corresponding alumina-bound catalyst. Thus, when exposed to a nitrogen rich feed, the low surface area and low silica to alumina ratio catalyst provides both improved activity and longer activity lifetime.

Figure 5:
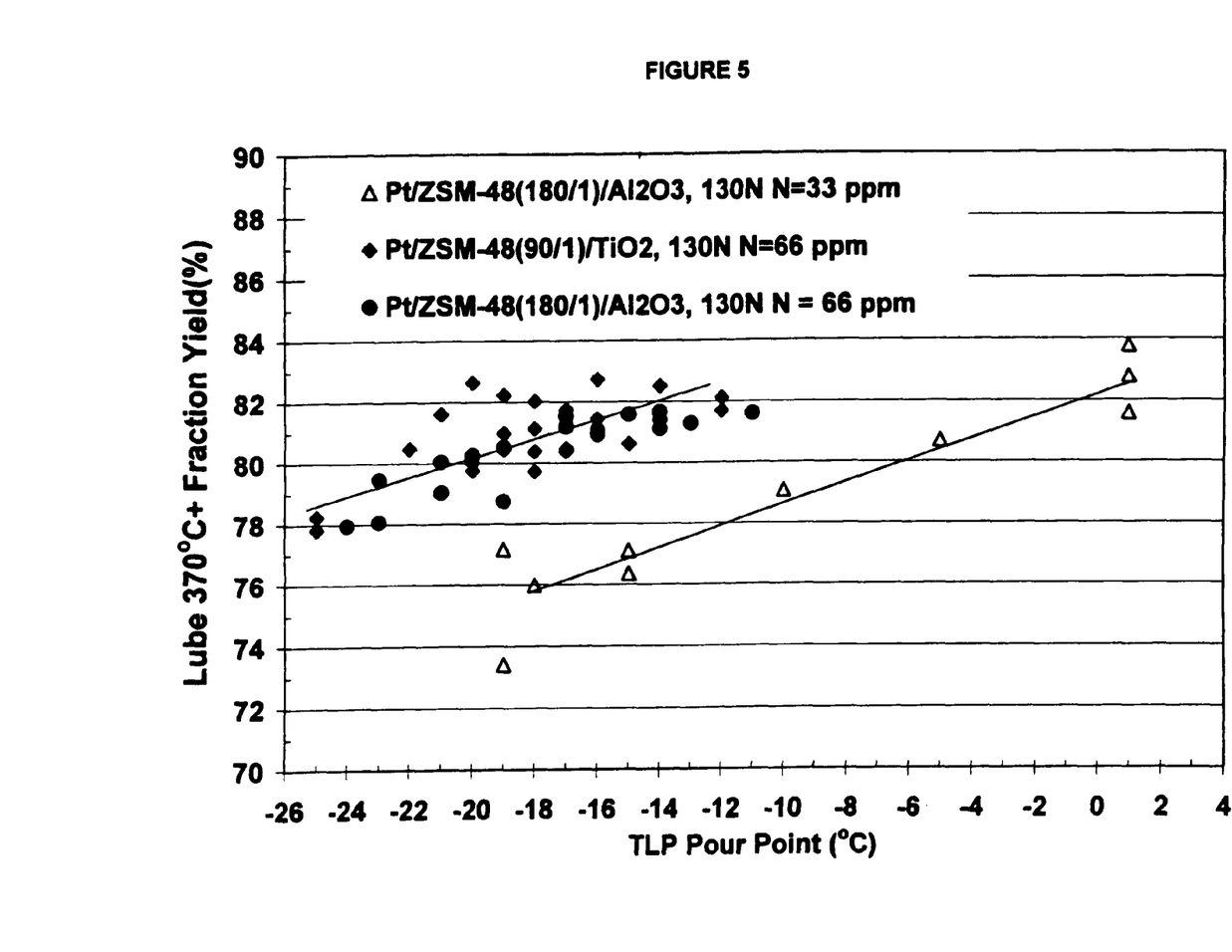
FIG. 5 shows the hydroprocessing product yield for various catalysts.

FIG. 5 provides the lubricant yield for the 0.6 wt % Pt on 65/35 ZSM-48(90/1)/TiO$_2$ catalyst and the two alumina bound catalysts shown in FIG. 3. The 0.6 wt % Pt on 65/35 ZSM-48(90/1)/TiO$_2$ provides the same lubricant yield as the corresponding alumina-bound (higher surface area) catalyst. The VI versus pour point relationships for the lower and higher surface area catalysts are also similar. Note that both the 0.6 wt % Pt on 65/35 ZSM-48(90/1)/TiO$_2$ catalyst and the corresponding alumina catalyst provided an improved pour point versus yield relationship as compared to the higher silica to alumina ratio catalyst.

Example 8

Mixed Binder Systems

This example illustrates that the advantage of a low surface area binder can be realized for mixed binder systems, where a majority of the binder is a low surface area binder.

An extrudate consisting of 65% (90/1 Si/Al$_2$) ZSM-48 and 35% of a mixed binder was loaded with 0.6 wt % Pt by incipient wetness impregnation with platinum tetraammine nitrate, dried at 250° F. and calcined in full air at 680° F. for 3 hours. The 35 wt % binder in the extrudate was composed of 20 wt % alumina (higher surface area) and 15 wt % titania (lower surface area).

A second extrudate consisting of 65% (90/1 Si/Al$_2$) ZSM-48 and 35% of a mixed binder was also loaded with 0.6 wt % Pt by incipient wetness impregnation with platinum tetraammine nitrate, dried at 250° F. and calcined in full air at 680° F. for 3 hours. In the second extrudate, the 35 wt % of binder was composed of 25 wt % titania (lower surface area) and 10 wt % alumina (higher surface area).

The activity of the above catalysts was tested in a batch micro-autoclave system. For the catalyst with a binder of 20 wt % alumina and 15 wt % titania, 208.90 mg and 71.19 mg of catalyst were loaded in separate wells and reduced under hydrogen, followed by the addition of 2.5 grams of a 600N feedstock. (The 600N feedstock had similar N and S levels to the 130N feed.) The "space velocity" was 1.04 and 3.03 respectively. The reaction was run at 400 psig at 345° C. for 12 hours. The resulting cloud point of the total liquid product was −18° C. at 1.03 WHSV and 21° C. at 3.09 WHSV.

For the catalyst with a binder of 25 wt % titania and 10 wt % alumina, 212.57 mg and 69.75 mg of catalyst were loaded in separate wells and reduced under hydrogen, followed by the addition of 2.5 grams of a 600N feedstock. (The 600N feedstock had similar N and S levels to the 130N feed.) The "space velocity" was 1.02 and 3.10 respectively. The reaction was run at 400 psig at 345° C. for 12 hours. The resulting cloud point of the total liquid product was −45° C. (detection limit of cloud point instrument) at 1.03 WHSV and 3° C. at 3.09 WHSV.

The above activity tests parallel the results from Examples 1 to 5 above. The catalyst containing a binder composed of a majority of high surface area binder behaved similarly to the catalyst with high surface area binder in Example 2. The catalyst with a majority of low surface area binder resulted in a much more active catalyst, as seen in Examples 1 and 3-5 above.

What is claimed is:

1. A method for producing a diesel fuel, comprising:
   hydrotreating a diesel boiling range feedstock containing at least 500 vppm of sulfur under effective hydrotreating conditions; and
   dewaxing at least a portion of the hydrotreated feedstock in the presence of a dewaxing catalyst under effective catalytic dewaxing conditions,
   wherein the dewaxing catalyst comprises a molecular sieve having a SiO$_2$:Al$_2$O$_3$ ratio of 100 or less, and a metal oxide binder, wherein the metal oxide binder in powder form has a surface area of 80 m$^2$/g or less, and the dewaxing catalyst has a ratio of zeolite surface area to external surface area of at least 80:100.

2. The method of claim 1, further comprising hydrotreating the dewaxed, hydrotreated feedstock under effective hydrotreating conditions.

3. The method of claim 1, further comprising separating the hydrotreated feedstock into a liquid effluent and a gas phase portion, and wherein dewaxing at least a portion of the hydrotreated feedstock comprises dewaxing the liquid effluent.

4. The method of claim 3, wherein separating the hydrotreated feedstock into a liquid effluent and a gas phase portion includes stripping the liquid effluent.

5. The method of claim 1, wherein the hydrotreated feedstock is cascaded to the dewaxing step without intermediate separation.

6. The method of claim 1, wherein the effective hydrotreating conditions include a temperature from about 315 to about 425° C., a pressure from about 300 to about 3000 psig, a Liquid Hourly Space Velocity (LHSV) from about 0.2 to about 10 h$^{-1}$, and a hydrogen treat rate from about 500 to about 10000 scf/bbl.

7. The method of claim 6, wherein the effective dewaxing conditions include a temperature from about 280 to about 380° C., a pressure from about 300 to about 3000 psig, a LHSV from about 0.1 to about 5.0 h$^{-1}$, and a treat gas rate from about 500 to about 5000 scf/bbl.

8. The method of claim 7, wherein the molecular sieve has unidimensional 10-member ring pores.

9. The method of claim 7, wherein the molecular sieve is EU-1, ZSM-35, ZSM-11, ZSM-57, NU-87, ZSM-22, EU-2, EU-11, ZBM-30, ZSM-48, ZSM-23, or a combination thereof.

10. The method of claim 7, wherein the molecular sieve is EU-2, EU-11, ZBM-30, ZSM-48, ZSM-23, or a combination thereof.

11. The method of claim 7, wherein the molecular sieve is ZSM-48, ZSM-23, or a combination thereof.

12. The method of claim 7, wherein the ratio of $SiO_2:Al_2O_3$ is 80 or less.

13. The method of claim 7, wherein the ratio of $SiO_2:Al_2O_3$ is 60 or less.

14. The method of claim 7, wherein the metal oxide binder has a surface area of 60 $m^2/g$ or less.

15. The method of claim 7, wherein the dewaxing catalyst has a ratio of zeolite surface area to external surface area of at least 90:100.

16. The method of claim 7, wherein the dewaxing catalyst has a ratio of zeolite surface area to external surface area of at least 105:100.

17. The method of claim 7, wherein the binder is silica, alumina, titania, zirconia, or silica-alumina.

18. The method of claim 17, wherein the binder further comprises a second metal oxide different from the first metal oxide.

19. The method of claim 18, wherein the second metal oxide is silica, alumina, titania, zirconia, or silica-alumina.

* * * * *